US006542268B1

(12) United States Patent
Rotolo et al.

(10) Patent No.: US 6,542,268 B1
(45) Date of Patent: Apr. 1, 2003

(54) OPTICAL CHANNEL CROSS CONNECT FOR TELECOMMUNICATION SYSTEMS IN WDM TECHNOLOGY (WAVELENGTH DIVISION MULTIPLEXING) HAVING A DOUBLE SPATIAL SWITCHING STRUCTURE OF OPTICAL FLOWS STRICTLY NOT BLOCKING AND INTERPOSED FUNCTIONAL UNITS OPERATING ON SINGLE CHANNELS

(75) Inventors: Salvatore Rotolo, Milan (IT); Stefano Brunazzi, Parona (IT)

(73) Assignees: STMicroelectronics Srl, Milan (IT); CNX S.p.A., Milan (IT)

( * ) Notice: Subject to any disclaimer, the term of this patent is extended or adjusted under 35 U.S.C. 154(b) by 0 days.

(21) Appl. No.: 09/472,887

(22) Filed: Dec. 28, 1999

(30) Foreign Application Priority Data

Dec. 28, 1998 (EP) .......................... 988307087

(51) Int. Cl.[7] .............................................. H04J 14/02
(52) U.S. Cl ...................... 359/128; 359/127; 359/124; 359/117; 359/110; 370/228; 370/225; 370/217; 370/216
(58) Field of Search ................................ 359/110, 117, 359/119, 123, 124, 125, 127, 128

(56) References Cited

U.S. PATENT DOCUMENTS

| 5,194,977 A | * | 3/1993 | Nishio .......................... 359/123 |
| 5,612,805 A | | 3/1997 | Fevrier et al. |
| 5,731,887 A | * | 3/1998 | Fee ............................. 359/110 |
| 5,818,816 A | * | 10/1998 | Chikazawa et al. .......... 370/225 |
| 5,867,289 A | * | 2/1999 | Gerstel et al. ............... 359/110 |
| 5,937,117 A | * | 8/1999 | Ishida et al. ................. 359/123 |
| 6,046,833 A | * | 4/2000 | Sharma et al. ............... 359/110 |
| 6,058,227 A | * | 5/2000 | Wong .......................... 359/128 |
| 6,115,517 A | * | 9/2000 | Shiragaki et al. ............ 359/128 |
| 6,148,124 A | * | 11/2000 | Aksyuk et al. ............... 359/127 |
| 6,201,620 B1 | * | 3/2001 | Anhorn ....................... 359/110 |
| 6,262,821 B1 | * | 7/2001 | Fevrier et al. ............... 359/117 |
| 6,307,653 B1 | * | 10/2001 | Bala et al. ................... 359/110 |
| 6,317,529 B1 | * | 11/2001 | Kashima ..................... 359/128 |

OTHER PUBLICATIONS

Okamoto S. et al., Journal of Lightwave Technology vol. 14, No. 6, Jun. 1, 1996, pp. 1410–1422, XP000598543.
Munter E. et al., ISS '95, World Telecommunications Congress, (International Switching Symposium), Advanced Switching Technologies for Universal Telecommunications at the Beginning of the 21$^{st}$ Century Berlin, Apr. 23–28, 1995, vol. 1, No. SYMP. 15, Apr. 23, 1995, pp. 389–393 XP000495600.

* cited by examiner

Primary Examiner—Jason Chan
Assistant Examiner—David Kim
(74) Attorney, Agent, or Firm—Birch, Stewart, Kolasch & Birch, LLP

(57) ABSTRACT

An optical cross-connect for the switching of optical channels at variable bit-rate (up to 10 Gbit/s), wavelength division multiplexed on bi-directional optical fibers forming the transmission backbone of a transport network; in particular the cross-connect can be interfaced to fibers crossing the nodes of a ring having large territorial extension, provided with protection fibers. The cross-connect includes a spatial Split & Select input stage of WDM aggregates, followed by a set of channel filters tunable on the whole optical range occupied by the channels, which jointly form a structure strictly not blocking the access to the channels by a set of bridge units whose functionality is selectable on a per-channel basis, such as for instance: transit, drop/insert, regeneration, etc. An output optical spatial Split & Select stage connects in a strictly non-blocking way the single channels from bridge units to optical multiplexers that reconstruct the WDM aggregate on the output fibers. The duplicated architecture of the bridge units for the protection fibers enables the protection of each single local drop/insert channel (FIGS. 9a and 9b).

18 Claims, 8 Drawing Sheets

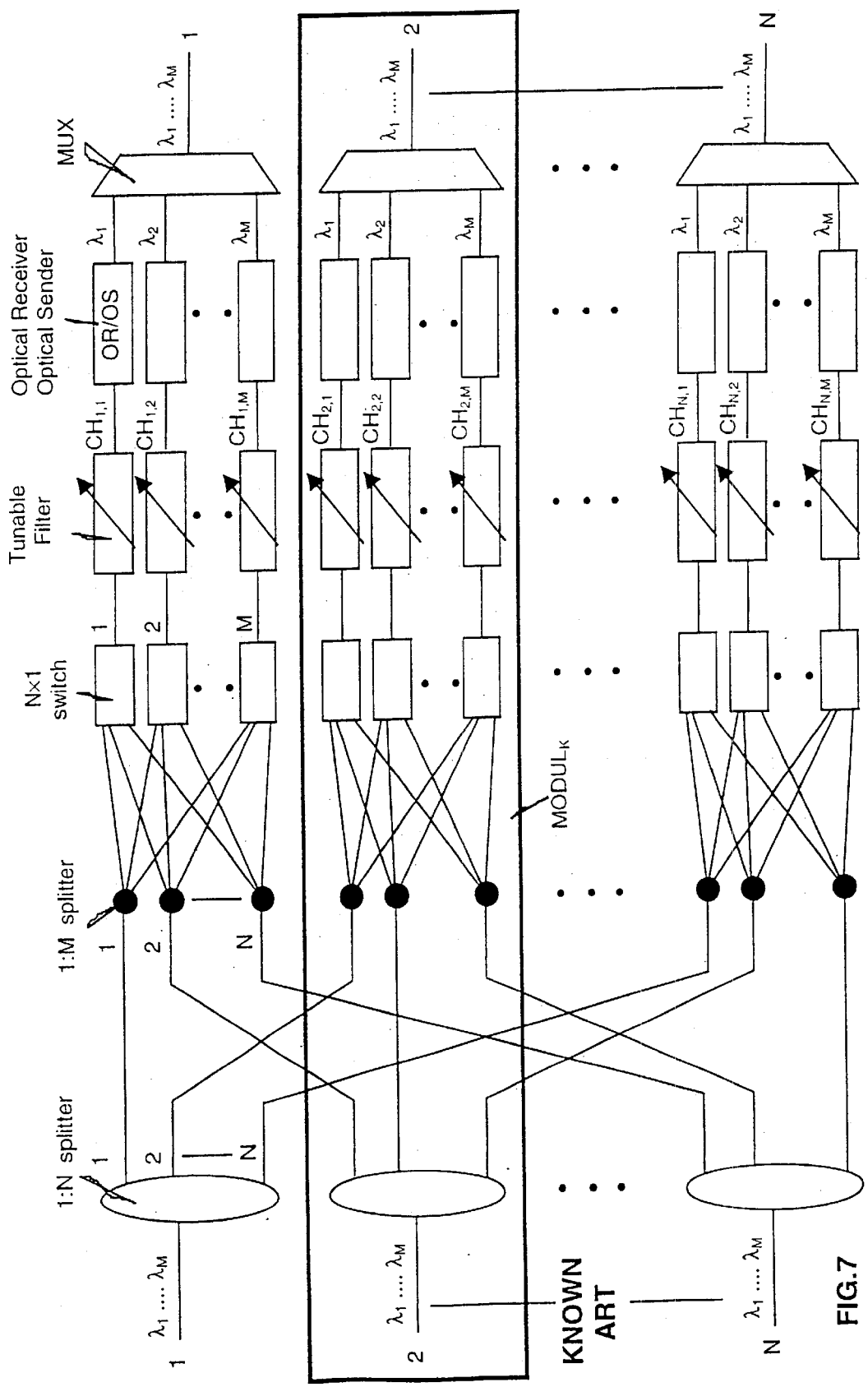
FIG.7 KNOWN ART

OPTICAL CHANNEL CROSS CONNECT FOR TELECOMMUNICATION SYSTEMS IN WDM TECHNOLOGY (WAVELENGTH DIVISION MULTIPLEXING) HAVING A DOUBLE SPATIAL SWITCHING STRUCTURE OF OPTICAL FLOWS STRICTLY NOT BLOCKING AND INTERPOSED FUNCTIONAL UNITS OPERATING ON SINGLE CHANNELS

FIELD OF THE INVENTION

The present invention relates to the field of optical fiber communications, and more in particular, to an optical channel cross connect for communication systems in WDM (Wavelength Division Multiplexing) technique, having a double spatial switching structure on optical flows, strictly not blocking, and interposed functional units operating on each single flow.

Starting from the first appearance of the optical fiber as physical carrier in telecommunication networks, the domain of the technique, the present invention falls under, has been characterized by an ever-increasing progress in optical devices, which enable such form of communication. We can briefly mention the following optical devices available on the market at the date:

Erbium Doped Fiber Amplifiers, known with the, acronym EDFA, which, pumped by a laser signal at an appropriate wavelength $\lambda$, can amplify WDM optical flows having total capacity highly exceeding 10 Gbit/s, maintaining a sufficiently flat gain response within a band of minimum attenuation of the single-mode optical fiber, typically ranging from 1530 to 1565 nm.

Band-pass filters having bandwidth lower than 1 nm, capable of being electronically tuned from one to any other wavelength, inside the above mentioned spectral interval of approximately 35 nm, within switching times of some, having low insertion losses, and low crosstalk among different channels (lower than −30 dB).

2×2 switching elements in waveguide on Lithium Niobate substrate, material capable to remarkably change its refraction index under the action of a relatively strong electrical field. These devices are used to implement optical path selectors which can be used as the basic elements of a M×N spatial division switching matrix, that can be obtained in a unique integrated circuit of the PLC type (Planar Lightwave Circuit). According to the present technology, it is not convenient to integrate matrices having dimensions larger than 8×8; the realization of more expanded optical matrices requires the assembly of several PLC devices duly interconnected through optical fibers.

Electro-mechanically controlled optical selectors, capable to spatially switch one of the N input optical flows to the unique outputs; these elements can be combined to build more complex matrixe structures, characterized by dimensions up to 16×16, at the state of the art.

Semiconductor optical amplifiers, known with the acronym SOA (Semiconductor Optical Amplifiers), based on the principle of travelling wave amplification. It is possible to implement simple high-isolation optical switches by driving the active device of such an amplifier to interdiction or saturation. These components are profitably used for the implementation of several different optical devices, among which the M×N matrices and the wavelength converters.

Broad band combiners (Optical Combiner) of N input optical flows, to form a unique output optical signal, that is the sum of the N input flows. In the case the flows entering a combiner have each one a different wavelength $\lambda$, an output signal is obtained, consisting of the wavelength division multiplexing of the entering flows, technique known under the acronym WDM (Wavelength Division Multiplexing).

Broad band splitters (Optical Splitters) splitting on more paths a unique entering signal, obtaining a plurality of identical, though attenuated, output signals. In practice, it is possible to implement an optical splitter by simply exchanging the inputs and the outputs of an optical combiner, considering that said optical components are reciprocal.

WDM signal demultiplexers (Wavelength Demultiplexers) accepting a WDM input signal composed of N wavelengths $\lambda$, and sending each of them to one of the different N outputs. The filtering property of these components, if realized in PLC technology, is generally obtained through a particular arrangement of planar waveguides, implementation known as AWG (Arrayed-Waveguide Grating).

Wavelength Converters that can be implemented according to different physical operation principles, for instance, by driving a SOA amplifier device to operate in a non-linear gain zone. It must be noticed just from now that the wavelength conversion functionality can be obtained also through Optical/Electrical/Optical (O/E/O) conversion, such as that made in case of optical signal Regeneration.

Optical transmitters, for the transformation of electrical signals present at the transmission interfaces of terminal stations intoloptical signals, suitable to fiber transmission. They typically include a semiconductor Laser emitting with high stability on a particular wavelength, a driving circuit imposing an on-off modulation of the light signal, acting either on the laser itself (direct modulation) or on an external optical modulator placed after the lagser (external modulation). Laser structures satisfying the requirements of a WDM system are for instance the Distributed Feedback (DFB) lasers; should the tuning capability of the laser be required on a wide spectrum interval, it is possible to consider different solutions, like the DBR (Distributed Bragg Reflector) structures.

Optical receivers, for the reverse transformation of the optical signal into the corresponding electrical signal carried, at the receiver interfaces of the terminal stations. They typically include a photodiode, made of adequately doped semiconductor material, and the electronic circuits for amplification, clock extraction, data reading.

BACKGROUND ART

The wide possibility of selection of optical devices can greatly facilitate the transition towards optical fiber networks, where not only the transmission of channels, but also the routing of flows among different nodes is performed within the optical layer, while in the present transport networks both the space and the time switching of channels are implemented in the electrical domain and require a double signal conversion, from optical to electrical and vice versa.

The WDM technique (acronym used in the optical sector in place of the FDM term used in the radio sector) can become therefore a key factor, not only to increase the transport capacity of the already existing optical infrastructures (enabling to transmit several channels in one fiber), but also toll increase the network flexibility, availing of the wavelength as additional degree of freedom for the switching, applying the principle of transparent optical path ("Wavelength Path"—WP). Then, if the additional function of wavelength conversion is available, the possible blocking conditions due to the non flexible assignment of wavelengths to fiber paths can be overcome: in fact, it becomes possible to route two channels, entering the node at the same wavelength, from different fibers, towards one output fiber, by converting the wavelength of one channel; this solution leads to the technique defined as Virtual Wavelength Path (VWP).

It must be pointed out that channels can be routed in a cross-connect, in the widest meaning of the term, by means of spatial switching, or wavelength-based switching, or through time demultiplexing and switching.

In spite of all its advantages, the present technology does not yet make the direct switching of digital packets convenient in the optical domain, consisting for instance of ATM (Asynchronous Transfer Mode) cells. This is due to the difficulty to fully implement in the optical domain memories and data processing devices, being nowadays still at research and development prototype level.

On the contrary, in the context of the spatial and of the wavelength-based switching, the known art proposes different solutions. The main difference between these two approaches lays in the fact that in the second instance, the wavelength conversion is absolutely necessary and the routing is made by selecting for the transmission a particular wavelength; while in the context of the spatial routing, the wavelength conversion is optional and is used not to support the switching, but to decrease the blocking probability, induced by constraints external to the node (occupation of wavelengths on the output fibers).

However, in both the cases, the full optical cross-connection is largely independent on the format and bit-rate of the original electrical flows, whether SDH, PDH, ATM, or other available format.

The present proposal will relate to a space switching optical cross connect, capable of performing wavelength conversion, where required.

A more general outlook on the scenario of existing solutions is however summarized below. It is worth to show some typical optical fiber network topologies, in order to represent the application field of the present invention, with the aid of FIGS. 1, 2, 3 and 4, mentioning the following articles which expand the concepts described up to now and offering a rather wide global picture on the problems of optical cross-connection:

"Is there an Emerging Consensus on WDM Networking?", by Charles A. Brackett, published on JOURNAL OF LIGHTWAVE TECHNOLOGY, vol. 14, no. 6, June 1996.

"Optical Path Cross-Connect Node Architecture for Photonic Transport Network", by Satoru Okamoto, Atsushi Watanabe, and Ken Ichi Sato, published on JOURNAL OF LIGHTWAVE TECHNOLOGY, vol. 14, no. 6, June 1996.

"Design and Implementation of a Fully Reconfigurable All-Optical Crossconnect for High Capacity Multi-wavelength Transport Networks", authors Amaury Jourdan, Francesco Masetti, Matthieu Garnot, Guy Soulage, and Michel Sotom, published on JOURNAL OF LIGHTWAVE TECHNOLOGY, vol. 14, no. 6, June 1996.

"An Optical Cross-Connect System as a HighSpeed Switching Core and its Performance Analysis", by Yongdong Jin and Mioshen Kavehrad, published on JOURNAL OF LIGHTWAVE TECHNOLOGY, vol. 14, no. 6, June 1996.

FIG. 1 of the present application shows a possible switching network scheme, based on a star-coupler architecture, called in this way due to the star topology characterizing the same. Said architecture finds wide application in point-multipoint connections, such as for instance in the distribution of TV signals in CATV (Cable Television) systems. In FIG. 1, the star-coupler placed in node A receives optical signals at different $\lambda$ on a same number of entering fibers and performs the WDM multiplexing on each outgoing fiber; users B, C, D, E, placed at the remote end of a relevant connection, are equipped with a channel filter, possibly tunable, to drop the channel of interest from the received broad band signal. According to what said above, the star-coupler of FIG. 1 performs a passive routing broadcast-and-select network; however this does not prevent the possibility to use the same star-coupler in different manner in non-broadcasting networks, of the type shown in FIGS. 2, 3 and 4, for instance causing the channel filters to be included in node A, as described also in the last paper mentioned above. Similar applications appeared in the following PCT applications published under No. WO 95/13687 and WO 97/31504. The quotations describe a relevant optical cross-connect for N input WDM signals and a same number of output ones, each flow including a set of M wavelengths that similarly repeats on the N input and output fibers. Both the described architectures include N input modules connected to a same number of output modules through N star-couplers, couplers, and foresee the possibility to perform a conversion of the wavelength set in the input stage, to avoid blocking conditions at the output, and a complementary conversion in the output stage to render the node transparent. Output modules of both the architectures are similar since they include: M×N tunable channel filters, followed by a same number of $\lambda$ converters, and include also N optical combiners having M inputs. The difference in input modules is mainly due to the fact that in each one of the N input modules of the optical cross-connect of the first quotation (WO 95/13687) it is foreseen the use of a set of tunable filters to separate the M channels, while in the second quotation (WO 97/31504) said use is not foreseen. This is the reason for which the N star-couplers of the first quotation have M single channel inputs, while those of the second quotation have N multichannel inputs. The mentioned documents emphasize the advantages of a node architecture based on the star-couplers rather than on the more traditional and expensive spatial division matrices.

It is interesting to notice that in the description of both the optical cross-connects a similar method is described to perform the drop/insert function, which consists in equipping a given number of optoelectronic input modules for the insert function and a same number of output modules for the drop function. This strategy is rather recurrent also in network nodes employing a spatial division matrix and has the drawback of requiring an increase of the size of the matrix or star-couplers, to accommodate the additional optoelectronic modules. On the contrary, when the matrix or star-coupler size has to be kept unchanged, the cross-connector would inevitably avail of a lower number of input and output modules for the primary optical flows.

FIG. 2 shows an optical fiber ring connecting four points, or nodes, A, B, C and D, respectively, placed along the circumference. These include all the optical equipment required for the operation and maintenance of the ring, as well as for the interfacing towards networks or local terminals. The growth in the traffic demand for a transport network of this type leads to estimate in some tens of Gbit/s (short term) and some hundreds of Gbit/s (medium term) the total capacity of WDM signals that must transit across each node of the ring. The ring of FIG. 2 can substantially extend on the territory, reaching a circumference of several hundreds of kilometers, or even some thousands, with some tens of nodes along the ring. Optical signals can cross the ring either in the CW (clockwise) or in the CCW (counterclockwise) direction, according to the implementation methods shown in FIGS. 5 and 6.

The configurations assumed by the fibers to implement the ring protections, are shown in FIGS. 5a and 6a, following the conventions adopted in FIGS. 5 and 6.

FIG. 3 shows a system composed of two rings similar to the one of FIG. 2, intersecting in nodes N1 and N2, which are therefore characterized by a more complex implementation. The generalization towards several intersecting rings is consequent, but as the number of rings increases a mesh network configuration, similar to that shown in FIG. 4 can result to be more advantageous.

Referring to FIG. 5, we can notice that the bi-directional traffic, crossing the nodes of ring in FIG. 2, is supported by employing two concentric rings, a first one for the clockwise CW propagation direction and a second one for the counterclockwise. CCW direction. Limiting the description only to the node A, a 'west side' and an 'east side' can be identified, on the left and on the right of the node center line, respectively. The ports of the west side of node A are respectively connected to the input fiber of Rx signals travelling on the CW ring and to the output fiber of Tx signals travelling on the CCW ring, while the ports on the east side are respectively connected to the output fiber of Tx signals travelling ion the CW ring and to the input fiber of Rx signals travelling on the CCW ring.

Making reference to FIG. 6, we can notice the bi-directional traffic, crossing the nodes of ring in FIG. 2, is supported by employing a unique fiber for the two transmission directions of the signal; it is then clear that the distinction between the signals flowing in CW or in CCW directions is obtained by assigning a different set of wavelengths to the two groups.

FIG. 5a shows a fiber configuration that assures a complete protection to the double ring of FIG. 5 through repetition of each ring, leading to a total of four rings. This configuration enables to implement protection schemes known under the term of 4F-BSHR (4-Fiber Bi-directional Self Healing Ring), that corresponds to a double directional protection. In FIG. 5a the signals concerning the different fibers are denoted as the Rx and Tx signals of FIG. 5, adding the letter W (Working) for the signals on the fibers usually in serviceand the letter P (Protection) for the signals on redundant fibers.

FIG. 6a shows a bidirectional protection that is simply obtained by the repetition of the ring and of the relevant flows of FIG. 6.

From the practical viewpoint, it is also possible to give a different representation of the signals of FIGS. 5 and 5a, where Rx signals are all shown on the left of the node, while Tx signals on the right hand. This representation, though less realistic than the original one, facilitates the schemeatic representation of a cross-connect; of course in the new representation, the association of the left and right part, of the node to an eastern and a western side is no longer meaningful.

One of the most important requirements to the manufacturers of optical communication system is the flexibility of the architecture proposed for the ring node in the network context. Flexibility must be ensured both during the normal operation and in presence of critical situations due to possible failures in fiber equipment and/or connections.

The first point implies the following requirements for the cross-connect:

it should be strictly not blocking, enabling to route any input channel, at any λ, to any output;

the interconnection status should be dynamically reconfigured, and the broadcasting of a channel, to all the outgoing fibers, allowed;

the regeneration of all the throughput channels, at different λ, should be possible the drop/insert of all the channels, at different λ, from/to all the WDM flows should be enabled, or, at least, of a fraction of them;

the conversion of any of the input channel wavelength to any of the output channel wavelength should be possible, for the whole set or at least for a sub-set of wavelengths;

the number of input/output ports and/or the number of channels per fiber can be easily increased fulfill higher traffic demands, property usually called scalability of the node.

As far as the second point is concerned, the possibility of performing the protection of the equipment located in the ring nodes, including also the node access devices in local environment, and the protection of fiber paths at single link and at ring level, should be foreseen. Moreover, customers urge the need of flexible protection schemes, which can be freely configured after the equipment installation, and, possibly, also during operation, avoiding to fixing these schemes during the network specification phase, as it happens up to now.

It is clear that the technical characteristics qualifying the capability of the system in facing the failures are not completely independent from those determining the operation flexibility. The manufacturers have a wide margin in designing the node architecture they consider the best one, but it is also true that it is rather difficult to conjugate in a particular architecture all those characteristics, often in conflict among them, suitable to simultaneously satisfy, at competitive costs, all the above mentioned requests.

The architectures seen up to now do not attain this purpose; considering in fact the optical cross-connects described in applications PCT WO 95/13687 and WO 97/31504 mentioned above, we highlighted for instanrce the incapability to implement at limited cost the drop/insert function on all the transit channel.

Another drawback, typical of the architectures implementing the spatial switching of WDM signals through star-couplers put between the input and output modules, is the necessity of using two M×N tunable filter groups, to obtain a strictly non-blocking configuration; this can be seen for instance in the first of the two patent quotations.

Concerning the already mentioned classical architecture of optical cross-connector based on optical demultiplexers followed by a spatial switching matrix followed by optical multiplexers, we can notice that it assures valid performances only if constructed around a unique non-blocking spatial matrix, by which all the throughput channels are routed. Successful demonstrations have been made in the field of research projects, however with limited size matrices (up to 16×16). Said dimensions are insufficient, in the light of realistic traffic requirements of an optical transport network; furthermore, the need to assure the drop/insert functionality of channels tends to require an additional increase of the optical matrix size. Matrices having size 32×32, scalable to 64×64 and 128×128, seem to be the minimum requested, in the context of this architecture; these are neither available at the state of the art, nor are expected to become available in a short time, considering also the urgent transmission performances necessary in a transport optical network.

Another disadvantage of these architectures is that a flexible choice of the set of used wavelengths is not possible, being the wavelength set fixed by WDM demultiplexers and multiplexers.

Therefore it is necessary to thoroughly investigate in the background art to look for better solutions. An optical cross-connect, which at a first sight could be considered as a good candidate, since it does not em ploy large and expensive spatial matrices, is the one based on the so called "parallel λ switch" architecture; this is outlined, for instance, at page 1414 of the volume containing the second paper mentioned above (Satoru Okamoto et al.), where it is also pointed out that the described architecture offers higher modularity and scalability, with respect to other structures. The "parallel λ switch" architecture is clearly represented in the FIG. 7 of the present application (corresponding to FIG. 8 of the quotatio).

Making reference to FIG. 7, we can notice that the mentioned optical cross-connect includes N input optical fibers carrying a same number of WDM input signals, and N output optical fibers carrying a same number of WDM output signals, each WDM signal consisting of N elementary flows at different wavelengths, $\lambda_1, \ldots \lambda_M$. Each entering fiber is connected to a relevant first broad band optical splitter, 1:N splitter, dividing the entering WDM signal in N identical WDM output signals, whose power is N times lower that that of the entering signal. Therefore, $N^2$ output signals are on the whole available, to be connected, according to the methods defined below, to the input of a same number of second broad bland optical splitters, 1:M splitter, dividing the WDM signal at their input in M identical WDM output signals, whose power is M times lower than that of the entering flow, and therefore, N×M times lower than that of the signal on the corresponding entering. fiber. The double level of splitting makes available in total $N^2 \times M$ WDM signals; N×M times attenuated with respect to the optical cross-connect input.

The connection between the first and second splitters takes place dividing these last in N groups of N elements each, and therefore connecting each output of an n-th first splitter to a second splitter of a group having the same numeral order of the considered output and the n-th position in the relevant group.

The selection of the N×M signals to be routed towards the N output fibers, among the $N^2 \times M$ WDM signals coming out from the whole of the second splitters, is done, in the cross-connect of FIG. 7, by N×M broadband optical selectors, each one consisting of a switch N×1 having N selectable inputs and one output, connected to a tunable channel filter, Tunable Filter, that can select any of the M wavelengths $\lambda_1, \ldots \lambda_M$ of the entering signal. The N×M optical selectors are divided in N groups of M selectors each, univocally associating the n-th group of optical selectors to the n-th group of second splitters and, for each pair of associated groups, connecting the M outputs of each second n-th splitter to the n-th inputs of the M optical selectors.

The output of the selectors are connected to a same number of Optical Regenerators, Optical Receiver, Optical Sender, regenerating the filtered signals and taking care to restore the correct power value of the signals transmitted forward. Due to the association between groups of second splitters and groups of optical selector, also the filters and the regenerators placed downstream the selectors turn out to be associated in identical manner. The outputs of M regenerators of a n-th group are sent to a same number of inputs of a broad band n-th wavelength optical multiplexer, MUX, whose output is connected to a relevant n-th output fiber, on which a WDM signal consisting of M wavelengths λ is transmitted.

From the above, we see that the architecture can be divided into N modules, as the one indicated as $MODUL_K$ in FIG. 7, each one associated to an output fiber. Any OS, inside a particular module, works under thy constraint of transmitting a determined and fixed wavelength λ, imposed by the particular multiplexer (MUX) port to which it is connected; this is the only way to obtain a correct WDM signal. The signals at the output of tunable filters correspond to a same number of $CH_{k,l}$ channels, indicated with two indexes, out of which, the first one (k) is referred to the n-th module and the second one (l) to the m-th wavelength; it is worth to recall that the physical wavelength by which the signal is carried, before an OR, can be different from the one transmitted by the corresponding OS, without constraints, since the OR/OS pair, making a double O/E/O signal conversion, can implicitly act as a wavelength converter (as said above). It is helpful to clarify that the cascade of the two input splitters, accomplishing two subsequent subdivisions of the signal by 1:N and 1:M, can be also seen as a unique subdivision of the same signal by one splitter 1:(N×M).

The remarkable operational parallelism of the input stage, which carries the WDM signals from the N input fibers up to the, N×M single channels OR/OS regenerators, can be noticed. Thanks to this configuration, it is possible to extend up to the input of the M channel filters, of all the N $MODUL_K$ modules, any of the entering optical fibers; the simultaneous connection of several fibers to a same filter being prevented by optical selectors placed upstream the filters. It is instead possible to extend a same entering fiber to all the N modules and implement the broadcasting of the concerned WDM signal, or of a single λ towards all the output fibers. To this purpose, it is sufficient to arrange the optical selectors such as to choose the signal from the same entering fiber, in all the $MODUL_K$ modules, and to set tunable filters according to the same selectivity scheme for all the $MODUL_K$ modules.

Though with the advantages highlighted in the input stage, the architecture of FIG. 7 has the disadvantage of being not as well effective in the output stage, in practice, reduced to the sole N multiplexers MUX. This constraint, as we shall see, negatively reflects on the cross-connect to the extent to nullify the potential advantages due to the high parallelism of the input stage. Also, a clear indication of how to perform the drop/insert of local channels is missing.

A common constraint, for all the architectures described up to now, and those shown in the mentioned technical literature, is that of being not sufficiently flexible as for the protection of local channels for which the drop/insert functionality is required. In fact, it can be noticed that in the known cross-connects the protection is made on the whole WDM aggregate of a fiber, therefore, at least in the case of architectures similar to those of the previous two patent quotations, it is necessary to foresee specific protection schemes for local channels, separate from those foreseen for transit channels. On the contrary, in the case of the cross-connector of FIG. 7, in lack of clear references drawn out from the article, we thought, just to demonstrate the conclusions that will follow, to produce ex-post facto, part of the novel technical characteristics proper of the invention which must still be described. That is, we assumed to modify the blocks of OR/OS regenerators to introduce the drop/insert functionality. Now, it is immediate to notice from the simple analysis of FIG. 7 that this modification, in case of break of an output optical fiber, would completely nullify the possibility to protect channels locally inserted in a $MODUL_K$ module, referred to the broken k-th fiber. The trouble is due to the absence, of flexibility in the output stage.

SUMMARY OF THE INVENTION

Therefore, object of the present-invention is to overcome the drawbacks of the cross-connects of the known art, such as for instance the last highlighted disadvantage, or the stringent requirement of a single non-blocking spatial matrix, or the need to increase the size of the matrix, or of star-couplers, to accommodate the additional optoelectronic modules of locally drop/insert channels.

A further object of the invention is to indicate an optical cross connect architecture having improved flexibility of operation and scalability.

A further object of the invention is to indicate an optical cross-connect architecture that supports flexible protection schemes, and other requirements to tailor the node characteristics to different contexts it might operate into.

To attain said objects, scope of the present invention is an optical channel cross-connect connected to N optical input fibers and at least a same number of output fibers, the same being crossed by relevant signals obtained from the multiplexing of M component flows transmitted at different wavelengths, and each n-th entering fiber being connected to an N×M ways n-th input optical splitter, said N×M ways being connected to n-th inputs of a set of N×M input optical selectors having N inputs and one output, the outputs of said optical selectors being connected to relevant optical channel filters tunable to any of the M wavelengths of the input signal, said filters being subdivided to form N groups of M filters and each group of filters sending the M filtered channels towards an output stage including N optical combiners having N inputs and one output, the N outputs of the optical combiners being connected to a same number of output optical fibers on which M channels are multiplexed, wherein the output stage additionally includes:

N×M bridge units, whose functionality is selectable on individual basis, each unit being connected downstream a relevant channel filter to receive one channel, at any wavelength, on which its functionality is performed;

N×M output optical splitters having N output ways, each output splitter being connected downstream a relevant bridge unit to receive an optical signal at the wavelength on which the above functionality is performed, making it available on N ways;

N×M output optical selectors having N input and one output, placed downstream said optical splitters to receive optical channels on N ways, and select one to be sent to an input of said optical combiner included in the output stage; the connections among said optical output splitters and selectors providing an m-th channel coming from one said n-th group of channel filters, at an n-th input of output optical selectors connected to relevant m-th inputs of said optical combiners, as described in claim 1.

The architecture of the cross-connect scope of the present invention can simultaneously achieve all the above mentioned objects, thanks to a "split & select" stage, increasing the routing opportunities of a channel towards all the output fibers and to a bridge stage, which can be configured at single channel level, placed across an input stage of the "parallel λ switch" type and of the above mentioned split & select output stage. The architecture is strictly non-blocking, both in the input stage and in the output one, separately considered. The set of channel filters, which can be tuned on the whole used bandwidth, enables to face different formats of the WDM signals, in terms of number of channels and relevant spacing, without the need to employ fixed optical multiplexers/demultiplexers to routing purposes.

Thanks to the proposed architecture, it is now possible to locally insert any channel, with a fraction of locally inserted to throughput channels ranging from 0 to 100%, without equipping for this reason dedicated modules expanding the system size. To this purpose, it is sufficient to enable the insert function in the bridge unit selected for the channel to be inserted; the same applies to the local extraction of a channel through the drop function. It should be appreciated that the splitting and selection functions, before the output combining, enable to re-route a single channel irrespective of the WDM aggregate to which the same is normally assigned; this implies that the protection of the single locally inserted channel is allowed, fulfilling the important customer requirements for flexible protection schemes. This protection mechanism co-exists with the scheme for the protection of transit channels that foresees to switch on a stand-by fiber the whole WDM aggregate of an interrupted fiber, since this aggregate includes also channels locally inserted. In the description of the invention implementation below, the protection approach shall be resumed and expanded.

The idea to use functionally configurable bridge units, one for each of the channels that can pass through the cross-connect; allows obviously performing, if required, the regeneration of the monochromatic optical flows supporting the above-mentioned channels. The same applies to additional functionalities which may derive from system, specification, such as for instance the wavelength conversion, the possibility to process client signals in the electronic domain, in terms of overhead monitoring (e.g., on SDH frames), of exploitation of the unused portion of the client overhead to transport data necessary to the optical network itself, etc. On the other hand, whenever the transparency requirement (in terms of pure optical processing and independence on the client signal type) is imposed by network design constraints and permitted by the transmission characteristics of the network, the bridge units can be equipped with optical components capable to restore the transmission qualities of the signal in a merely optical way (amplification, equalization and power control).

From the above, it comes out the great flexibility made possible by the bridge units used in the cross-connect scope of the invention; said flexibility is achieved through the design of bridge units such to render the node suitable to operate in different contexts, and equipping the cross-connect with different combinations of the same.

BRIEF DESCRIPTION OF DRAWINGS

Additional objects and advantages of the invention shall be better understood from the following detailed description of an embodiment, given as an example but not limited to the same, and completed by the attached figures, where:

FIG. 7 shows the architecture of a cross-connect according to the known art;

DETAILED DESCRIPTION OF THE INVENTION

Figure 8:
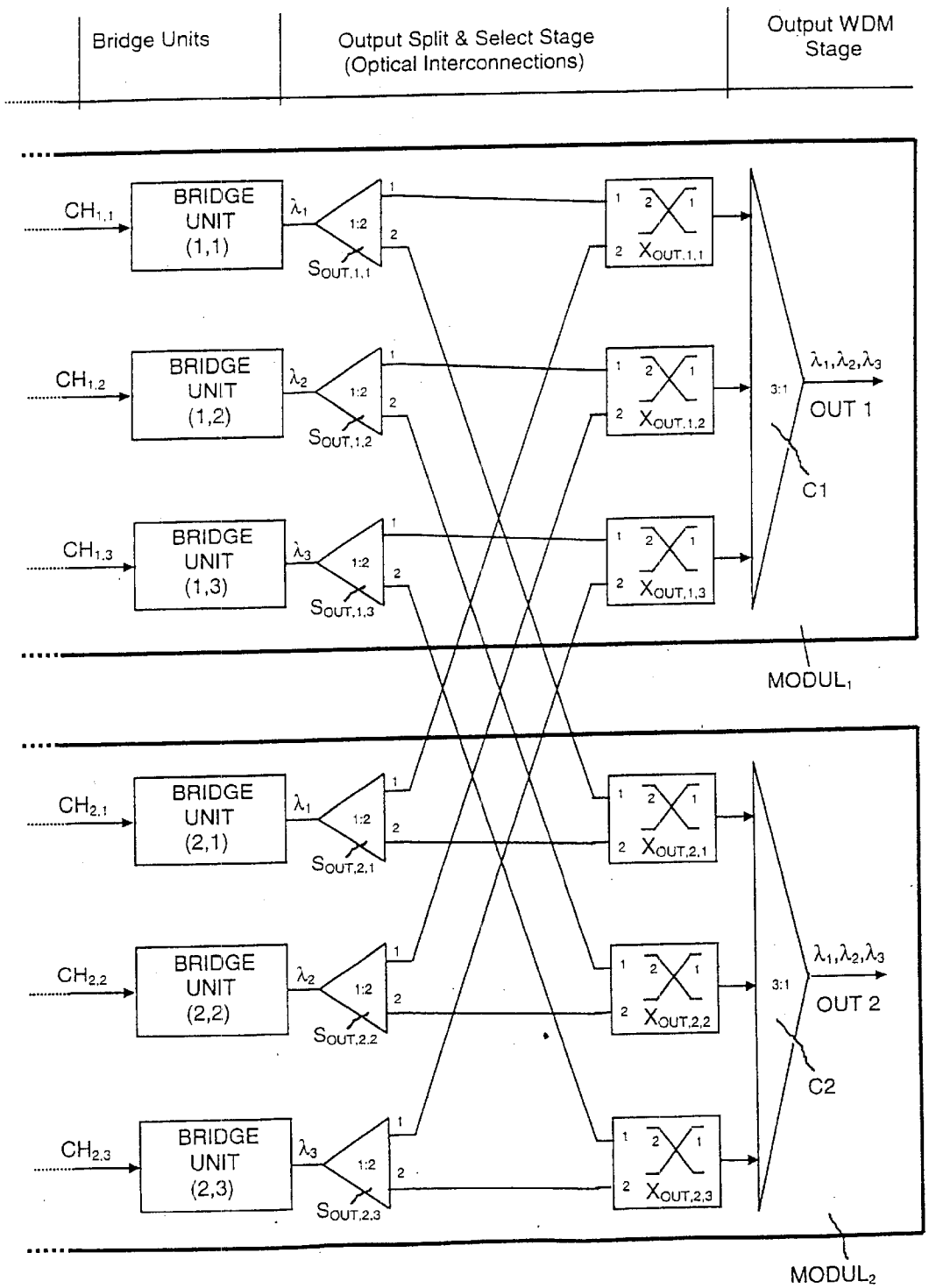
FIG. 8 shows the architecture of an output part of an optical cross-connect according to the present invention.

Making reference to FIG. 8, we can notice two partial modules $MODUL_1$ and $MODUL_2$ of an optical cross-connect, shown in its terminal part. The missing part of these modules is not indicated, since it is essentially similar to the corresponding one in FIG. 7, from the input fibers to the output of channel filters. The input of each module is reached by a relevant set of three channels $CH_{k,l}$ selected from three previous filters, among all the channels entering the node. Each channel reaches the input of a relevant bridge unit indicated by indexes k, l (whose meaning has already been clarified), whose output is connected to a relevant two-way optical splitter $S_{OUT,k,l}$. At the output of each bridge unit, the channel is modulated on a defined wavelength, suitable to multiplexing and transmission in the output fiber. The three channels at the output of the three bridge units belonging to each module are at three different wavelengths $\lambda_l$, that recur (the $\lambda_l$, not the channels) in the same way in the two modules. The same requirement is valid on channels $CH_{k,l}$ at the module input section (before the bridge units) only in the case of transparent transit (e.g., pure optical amplification) in the bridge unit itself; if on the contrary, the bridge unit includes a regenerator, no constraint is imposed on wavelengths before the bridge units.

Each one of the two modules $MODUL_K$ includes also three optical selectors $X_{OUT,k,l}$ with two inputs. The inputs of the optical selectors $X_{OUT,k,l}$ of a module $MODUL_K$ are suitably interconnected to the outputs of the optical splitters $S_{OUT,k,l}$ of both the modules $MODUL_1$ and $MODUL_2$. The outputs of the three optical selectors $X_{OUT,k,l}$ of a $MODUL_k$ module are connected to a same number of inputs of an optical combiner $C_k$ inside the module, from the output OUT k of which a relevant WDM signal comes out, occupying a bandwidth determined by the transmitted wavelengths $\lambda_1$, $\lambda_2$ and $\lambda_3$. The interconnection among the optical splitters $S_{OUT,k,l}$ and the optical selectors $X_{OUT,k,l}$ takes place according to the following principle: the outputs of an optical splitter $S_{OUT,k,l}$ are connected to the inputs k of a same number of optical selectors $X_{OUT,k,l}$. These last shall be set time by time, to face different possible system operating conditions, for instance; the normal routing of optical flows, the link protection, ring protection, broadcasting, channel by channel protection, etc. In the case of simple routing, protection excluded, the group of optical selectors $X_{OUT,k,l}$ of the first module select the signals present at input 1, while the selectors of the second modules select the signals present at input 2; in other terms, the channel $CH_{k,l}$ is normally routed to the input 1 of the combiner belonging to the module 1.

FIG. 8 has been mainly introduced to better highlight the modular structure of the considered cross-connect, which shall not appear so clear in the subsequent figures, due to their higher complexity. A reference to the representation of these figures shall be made for the functional description. The advantage of the modular structure is to improve the property of node scalability, simplifying the expansion of the equipment to meet increased traffic demands.

Figure 9A:
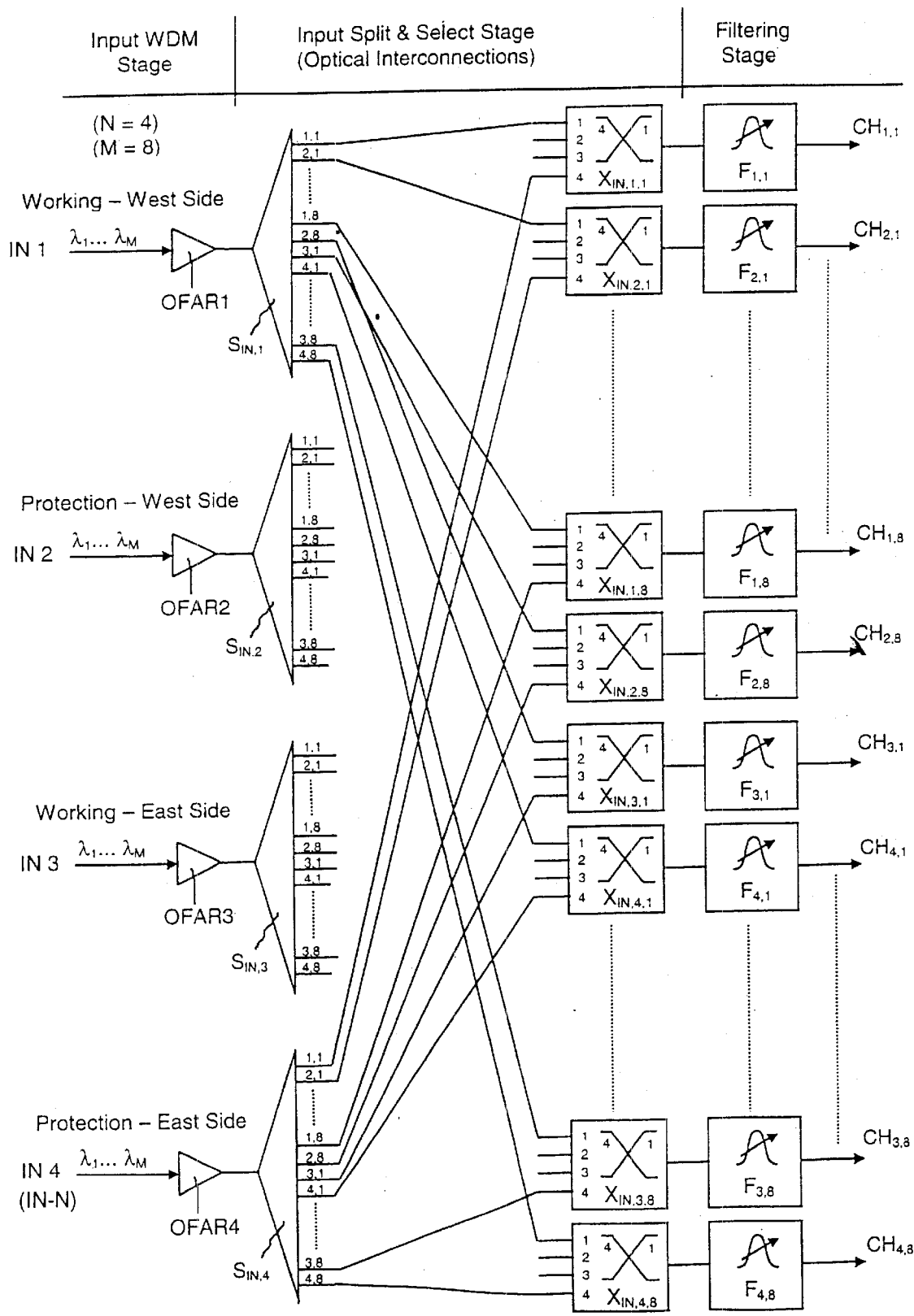
FIGS. 9a and 9b, respectively show an input and an output portion which, when joined, form the architecture of an optical cross-connect according to the present invention.
Figure 9B:
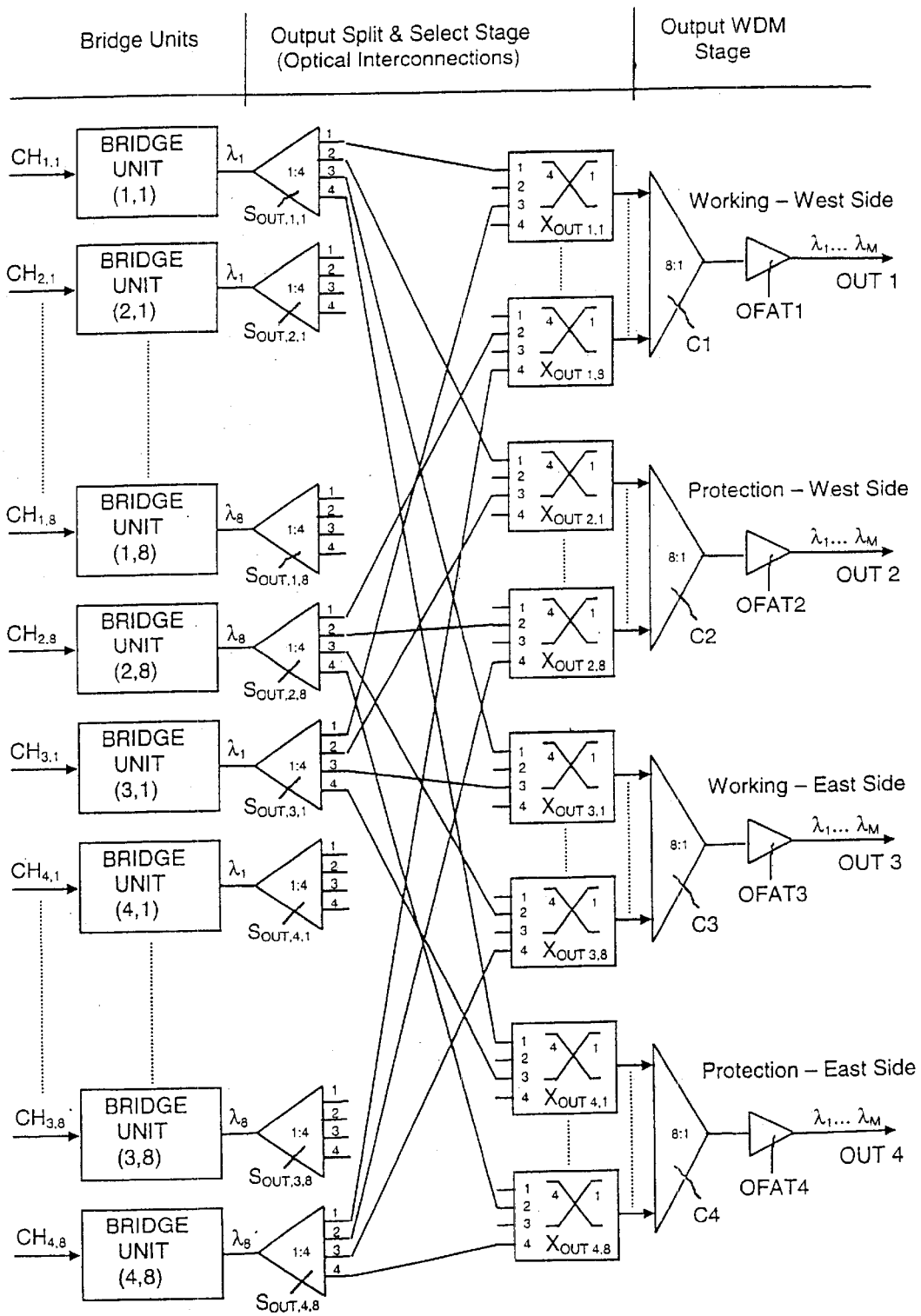

FIGS. 9a and 9b, jointly taken, describe an embodiment of the present invention, highlighting a configuration oriented to the protection schemes enabled in the node. If the structure of the considered cross-connect is interpreted in terms of vertical modularity, the following functional stages can be identified; input WDM Line Interface Stage, input Split & Select stage, Filtering Stage, Bridge Unit Stage, output Split & Select stage, and output WDM Line Interface Stage. FIG. 9a refers to the first three stages and FIG. 9b to the other ones. The structure shown in FIG. 9a, by itself, can be referred to the corresponding one in the architecture of FIG. 7, known as "parallel λ switch".

The differences that can be identified between the relevant parts of FIGS. 7 and 9a are mainly concerning the form; for instance, they consist in the different ordering of channel filters, which in the first case gives priority to the representation of the modularity while in the second case, to the protection schemes. Furthermore the use of passive spatial optical selectors is proposed as a more satisfactory and realistic solution in respect of active switches based on SOA, being this last however an implementation difference of a same functionality.

Figure 1:
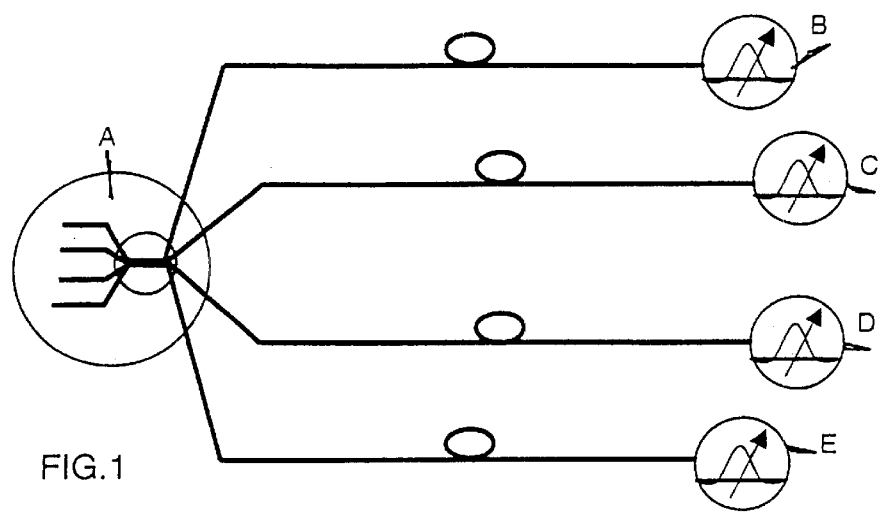
FIGS. 1 to 6a show the diagram of some common configurations assumed by territorial connections in optical fiber.
Figure 2:
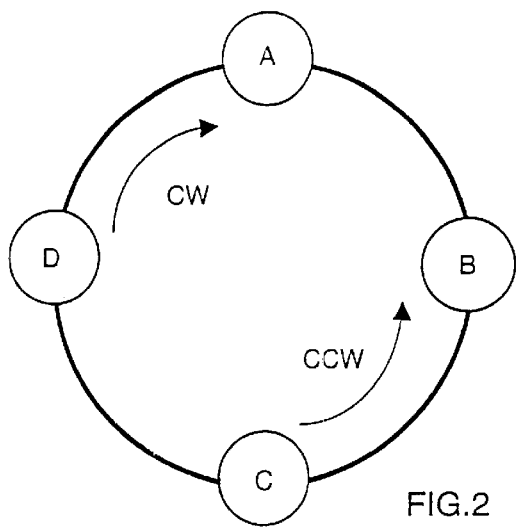
Figure 3:
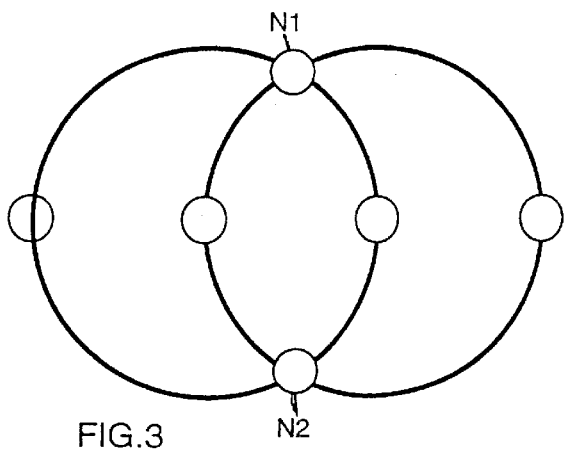
Figure 4:
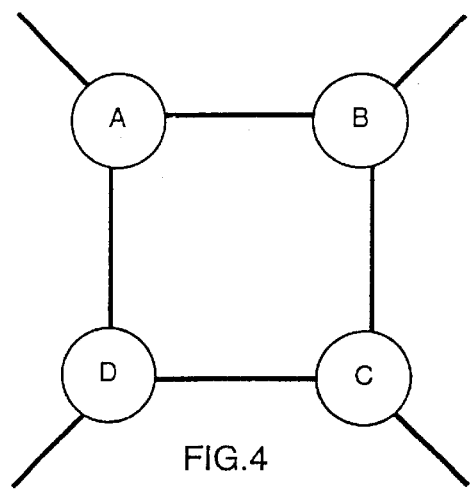

Making reference to FIG. 9a, we see that in the input WDM stage N=4 input optical fibers are foreseen for a same number of input WDM signals, IN1, . . . , IN4, each one composed of M=8 different multiplexed optical flows, transmitted at different wavelengths $\lambda_1, \ldots, \lambda_M$ generated in different access points along the ring of FIG. 2. If the node is employed in a ring network, the meaning of the signals IN1, . . . , IN4 can be interpreted, in order, as: west side Working, west side Protection, east side Working, and east side Protection. These signals reach relevant line termination—receiving side—and amplification sections OFAR1, . . . OFARN, described below, from where they proceed towards the broadband input Split & Select Stage. This last includes N input broadband splitters $S_{IN,1}, \ldots, S_{IN,4}$, each of them splitting an input signal on N×M ways. It is convenient to indicate with a couple of indexes k,l, the output ports of the splitters $S_{IN,i}$ ($1 \leq i \leq N$) and select said indexes k,l, to indicate hereinafter in a similar manner the channels and different devices encountered. With this position and in normal operation conditions, the index k is associated to the output WDM port k (k-th output fiber) and the index l to the output λ wavelength, being: $1 \leq k \leq N$ and $1 \leq l \leq M$.

The input Split & Select stage includes also N×M input optical selectors $X_{in,k,i}$ each one characterized by N inputs. The $N^2 \times M$ signals coming out from the N $S_{IN,i}$ splitters are connected to a same number of inputs of the selectors $X_{in,k,l}$. The output of a generic optical selector $X_{in,k,l}$ is connected to a relevant channel filter $F_{k,l}$ belonging to the filtering stage, tunable over the whole WDM bandwidth, in order to assure a non-blocking behaviour.

Making reference to FIG. 9b, the structure of the remaining part of the cross-connect connect scope of the invention is described, considering also what already said for FIG. 8, provided that the two-fiber connectivity diagram described there is extended to four-fibers. The first stage encountered in the figure is that of the bridge units. Said units as from the name itself, are placed across the stages of input optical connections and output optical connections. The number of bridge units is N×M, i.e., these are as many as the channel filters they are associated to, and of which they share the nomenclature of indexes k,l and the type of grouping, which sees close the channels $CH_{k,l}$ and $CH_{k+1,l}$, respectively directed towards a working fiber the related protection fiber, and that, after the bridge units, appear as signals at the same wavelength $\lambda_l$. Appropriate figures shall be dedicated to the different types of bridge units, therefore optical and/or electrical bi-directional connections between a bridge unit and local user equipment shall purposely be omitted in FIG. 9b.

The output Split & Select Stage connects thee set of bridge units to the output WDM stage, through N×M output optical splitters $S_{out,k,l}$ characterized by N ways, and a same number of output optical selectors $X_{out,k,l}$ characterized by N inputs. The put of each bridge unit k,l is connected to a relevant splitter $S_{out,k,l}$. For each selector, the input which is selected in normal working conditions is defined as the main one. The other N−1 inputs are defined as auxiliary inputs, selectable for instance during protection procedures. The interconnection between the outputs of the splitters $S_{out,k,l}$ and the inputs of the selectors $X_{out,k,l}$ takes place according to the following connection diagram: the N outputs of a splitter k,l are connected in order to the inputs k of selectors $X_{out,i,l}$ ($1 \leq i \leq N$), each one generally set to select the main input.

To simplify the understanding of the optical interconnection diagram of FIG. 9b, we provide the following table:

Table of Interconnections in FIG. 9b

Legend:
index k: $1 \leq k \leq N=4$; indicates the combiner Ck, and the output fiber (and the module in FIG. 8);
index l: $1 \leq l \leq M=8$; indicates the wavelength $\lambda$ and the position of the corresponding selectors $X_{out}$ at the input of combiners;
index i: $1 \leq i \leq N=4$; indicates the output of splitters $S_{out}$;
index j: $1 \leq j \leq N=4$; indicates the input of selectors $X_{out}$.

| Index K | Index l | $S_{out,k,l,i}$ | $X_{out,k,l,i}$ |
|---|---|---|---|
| 1 | 1 | 1, 1, 1 | 1, 1, 1 |
| 1 | 1 | 1, 1, 2 | 2, 1, 1 |
| 1 | 1 | 1, 1, 3 | 3, 1, 1 |
| 1 | 1 | 1, 1, 4 | 4, 1, 1 |
| 1 | 2 | 1, 2, 1 | 1, 2, 1 |
| 1 | 2 | 1, 2, 2 | 2, 2, 1 |
| 1 | 2 | 1, 2, 3 | 3, 2, 1 |
| 1 | 2 | 1, 2, 4 | 4, 2, 1 |
| 1 | 3 | 1, 3, 1 | 1, 3, 1 |
| 1 | 3 | 1, 3, 2 | 2, 3, 1 |
| 1 | 3 | 1, 3, 3 | 3, 3, 1 |
| 1 | 3 | 1, 3, 4 | 4, 3, 1 |
| ... | ... | ... | ... |
| 1 | 8 | 1, 8, 1 | 1, 8, 1 |
| 1 | 8 | 1, 8, 2 | 2, 8, 1 |
| 1 | 8 | 1, 8, 3 | 3, 8, 1 |
| 1 | 8 | 1, 8, 4 | 4, 8, 1 |
| 2 | 1 | 2, 1, 1 | 1, 1, 2 |
| 2 | 1 | 2, 1, 2 | 2, 1, 2 |
| 2 | 1 | 2, 1, 3 | 3, 1, 2 |
| 2 | 1 | 2, 1, 4 | 4, 1, 2 |
| 2 | 2 | 2, 2, 1 | 1, 2, 2 |
| 2 | 2 | 2, 2, 2 | 2, 2, 2 |
| 2 | 2 | 2, 2, 3 | 3, 2, 2 |
| 2 | 2 | 2, 2, 4 | 4, 2, 2 |
| 2 | 3 | 2, 3, 1 | 1, 3, 2 |
| 2 | 3 | 2, 3, 2 | 2, 3, 2 |
| 2 | 3 | 2, 3, 3 | 3, 3, 2 |
| 2 | 3 | 2, 3, 4 | 4, 3, 2 |
| ... | ... | ... | ... |
| 2 | 8 | 2, 8, 1 | 1, 8, 2 |
| 2 | 8 | 2, 8, 2 | 2, 8, 2 |
| 2 | 8 | 2, 8, 3 | 3, 8, 2 |
| 2 | 8 | 2, 8, 4 | 4, 8, 2 |
| ... | ... | ... | ... |
| ... | ... | ... | ... |
| ... | ... | ... | ... |
| 4 | 1 | 4, 1, 1 | 1, 1, 4 |
| 4 | 1 | 4, 1, 2 | 2, 1, 4 |
| 4 | 1 | 4, 1, 3 | 3, 1, 4 |
| 4 | 1 | 4, 1, 4 | 4, 1, 4 |
| 4 | 2 | 4, 2, 1 | 1, 2, 4 |
| 4 | 2 | 4, 2, 2 | 3, 2, 4 |
| 4 | 2 | 4, 2, 3 | 3, 2, 4 |
| 4 | 2 | 4, 2, 4 | 4, 2, 4 |
| 4 | 3 | 4, 3, 1 | 1, 3, 4 |
| 4 | 3 | 4, 3, 2 | 2, 3, 4 |
| 4 | 3 | 4, 3, 3 | 3, 3, 4 |
| 4 | 3 | 4, 3, 4 | 4, 3, 4 |
| ... | ... | ... | ... |
| 4 | 8 | 4, 8, 1 | 1, 8, 4 |
| 4 | 8 | 4, 8, 2 | 2, 8, 4 |
| 4 | 8 | 4, 8, 3 | 3, 8, 4 |
| 4 | 8 | 4, 8, 4 | 4, 8, 4 |

A recurrent reading of the table enables to determine the following relationship between S and X indexes: k→j, l→l, i→k.

The N×M optical selectors $X_{out,k,l}$ are grouped on the basis of the value of the index k, to form N groups of M elements. Inside each group, the optical selectors are similarly ordered on the basis of the value of the index l. The outputs of the M optical selectors of a generic group k are connected to a same number of inputs of a broadband output optical combiner $C_k$, belonging to the WDM output stage. At the outputs of the N optical combiners $C_k$ a same number of signals WDM OUT1, . . . OUT4, are present; these pass through the relevant amplification and line termination units—transmission side—OFAT1, . . . , OFAT4 and are transmitted to relevant output optical fibers.

Figure 10B:
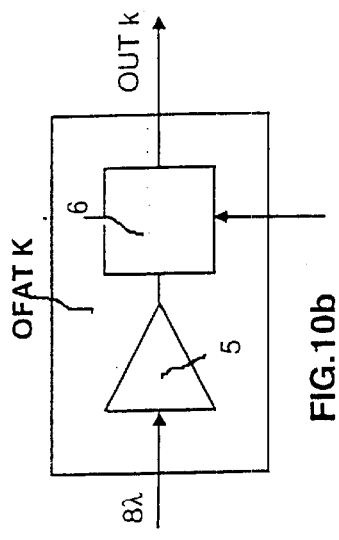
FIGS. 10a and 10b show in detail two blocks indicated OFAR and OFAT in FIGS. 9a and 9b, respectively.
Figure 10A:
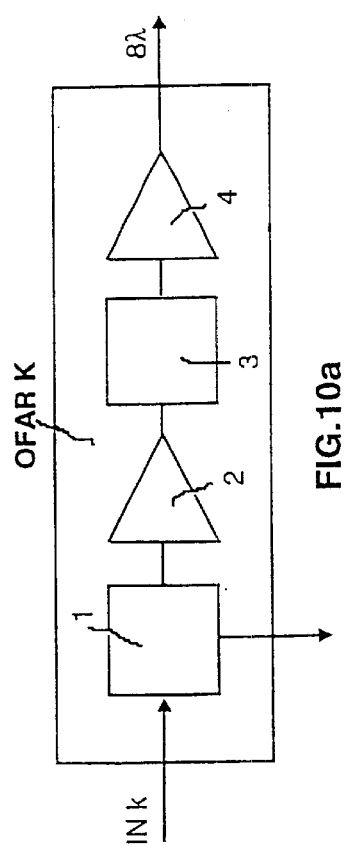

Referring to FIGS. 10a and 10b, the amplification units OFAR and OFAT are now described. Starting from FIG. 10a, it is first necessary to point out that each input WDM signal, in addition to the M payload chahnels at M different $\lambda$ included in the amplification band of the OFAR block, includes an additional supervision channel allocated out of band. In the case considered, it is assumed that the bit-rate of each payload channel is approximately 10 Gbit/s, corresponding to an STM-64 signal (Synchronous Transfer Module-64) of the SDH standard (Synchronous Digital Hierarchy). The generic reception and amplification section OFAR includes a sequence of four blocks, identified 1, 2, 3 and 4. Block 1 is an optical demultiplexer, which separates a supervision channel $\lambda$ from the remaining payload channels $\lambda$, and sends said channel to the Operation & Maintenance section devoted to the processing of this type of channel, that is terminated and not routed. Block 2 is an optical pre-amplifier, typically an EDFA, that performs the post-compensation of the losses due to the upstream fiber. Block 3 is a Dispersion Compensating Fiber module, i.e., a section of properly doped fiber, having pre-determined length, which recovers the shape of the received optical pulses by compensating the effects of chromatic dispersion related to the upstream fiber. Block 4 is an optical amplifier, typically an EDFA, that pre-compensates the losses that shall be introduced inside the node.

Considering now FIG. 10b it results, as already said for the input WDM stage, that each WDM signal on an output fiber includes an additional supervision channel, outside the amplification band of block OFATk, that is locally generated in the node. The block OFATk includes an optical amplifier 5 of the EDFA type (booster) performing the pre-compensation of the losses that shall be caused by the downstream link. After the booster 5, an optical multiplexer block 6 is placed, receiving from the Operation & Maintenance section a supervision channel λ and performing the multiplexing of said channel with the M payload channels on the output fiber.

As far as the optical cross-connect operation is concerned, as it results from FIGS. 9a, 9b, 10a, and 10b taken in conjunction, the aspects more directly related to the protection schemes adopted in a ring network shall be emphasized, consistently with the description given up to now of the particular embodiment of the invention. Afterwards, some embodiments of link units shall be considered.

Remembering the objects of the invention, this procedure meets the valuation of the innovative aspects of the present invention.

Figure 5:
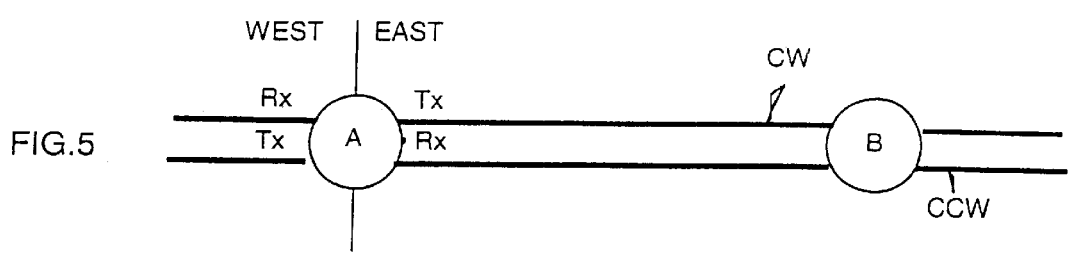
Figure 5A:
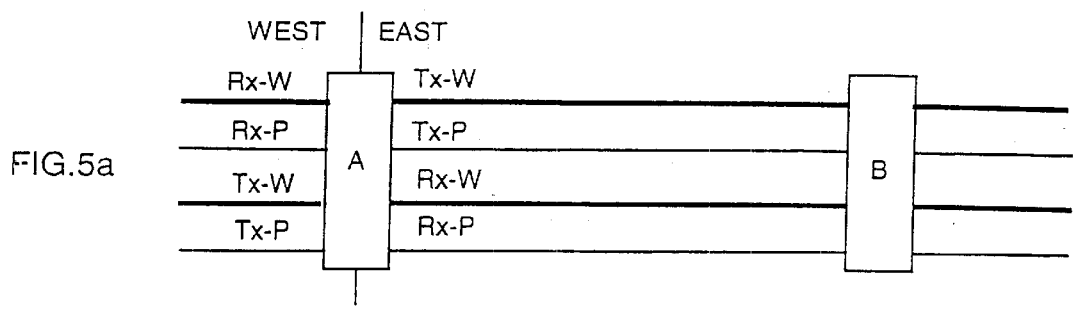
Figure 5B:
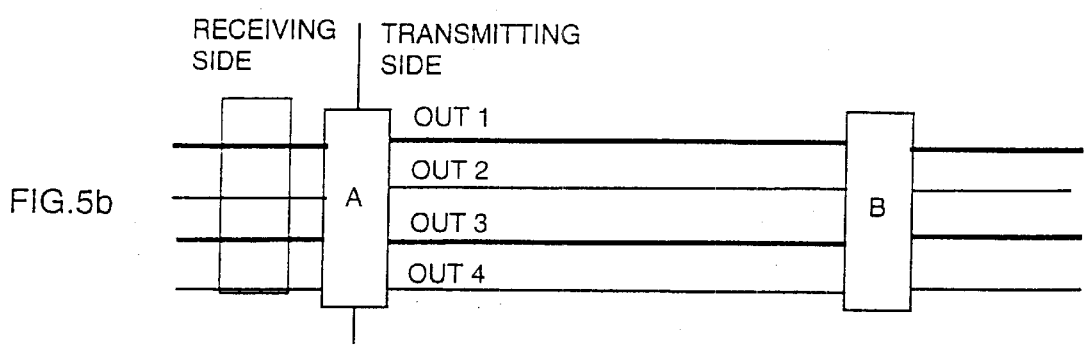

The four input and four output fibers configuration is of course that of the protection scheme shown in FIG. 5a, concerning the ring node A of FIG. 2, in the embodiment of FIG. 5b that shows the four input fibers on the left receiving side and the four output fibers on the right transmission side. FIGS. 2 to 6a highlight the main fibers transporting the WDM aggregates; these "backbone" fibers support a great quantity of traffic generated by users distributed in a large area, served by the nodes of the network (in this case, of the ring). A given number of bi-directional connections, optical fibers or other transmission media, are branched from the nodes, destined to local traffic (usually non WDM). In order to support these connections, the ring makes available one or more λ channels. It is clear that any form of protection shall be guaranteed also to the local channels in case of failure of the local link or of failure of the relevant equipment. One of the several functions of the stage formed by the bridge units of FIG. 9b is to interface the local connections to the ring, integrating the relevant channels in a cross-connect architecture capable to supply the necessary protection also to connections and equipment destined to local channels. The prevalence of local channels versus transit ones will characterize a node more towards an access function rather than a pure transit function; in any case a bridge unit gives the channel it is assigned to, an option between the transit and the local termination.

The optical fiber ring, actually is a telecommunication network of particular topology, whose purpose is common to other network typologies, that is to create connections between far points; therefore an optical channel inserted in a source node will be terminated in another destination node, crossing other nodes. The bidirectional communications between two nodes A and B typically take place through the shortest path, then occupying the minimum ring sector in the two directions (for instance CW A→B, CCW B→A), according to criteria defined by network management. In this way, the number of simultaneous connections on the ring can be maximized. It is helpful to this purpose the particular structure of the node, having two running directions, which, apart from redundancy, supports the transit of 16 independent payload channels, each one modulated by a signal at a bit-rate up to 10 Gbit/s, determining a maximum total transit throughput of 160 Gbit/s for each node.

The protection forms available along the ring enable to counteract different failure typologies, recognizing the distinction, between local equipment and interruptions of the fibers along the ring. The preliminary condition to be capable to operate protection procedures is the availability of a given redundancy of resources. In the four-fiber ring considered here, the already mentioned redundancy of the fibers is evident. Of course, the redundancy of the line termination and amplification sections is associated to the same, at the receiving side, OFARk (FIG. 9a) and at the transmitting side, OFATk (FIG. 9b) respectively, which make reference to operation and protection fibers. The node architecture, as it iis described, already includes the duplication of bridge units and of the relevant channel filters. In normal operating conditions, the working bridge units are connected to the working OFAR and OFATk sections, interfaced to the working fibers. Likewise, the protection bridge units are connected to the OFARk and OFATk protection sections interfaced to the protection fibers. In standard conditions, the protection fibers are kept empty, or occupied by maintenance signals.

The methods of execution of the different interconnections which characterize the operating normal condition, and enable the different protection schemes are assigned to a control unit, that is an integral part of the cross-connect. The control unit is informed about and discriminates the failure conditions of the devices involving the single channels and/or the failure condition of one or more input and/or output fibers, and enables time by time the protection scheme considered most suitable, according to pre-defined criteria. The recognition of the malfunction can be communicated to the control unit by the network management system at higher level (for instance of TMN type= Telecommunication Management Network), which is generally present and supervises the operation of the whole ring; as an alternative, it can be detected by the same node control unit on the basis of the information received by the lower level equipment controllers, or by the termination units of the supervision optical channel. Protection and node reconfiguration procedures are performed by acting on input $X_{in,k,l}$ and output $X_{out,k,k}$ selectors, included in the relevant Split & Select stages and setting the correct tuning of channel filters.

In case of fault of a selector, apart from the fact that the failure itself is the cause for the interruption of the optical signal path inside the node, the control unit is always able to isolate this component, thus preventing the failed component to interfere on the single channel transmitted.

In the case of a fiber break, concerning the network and not a single node, it is necessary that consistent protection procedures are performed in several nodes, at least in the two node adjacent to the interruption. To this purpose, the considered node is able to receive information both from the network management system mentioned above and from the units controlling the OAM (Operation And Maintenance) functions that Handle the information flow carried by the out of band supervisory channel. Likewise, the node control unit can supply information to the management system and generate OAM information, for instance using the output out of band supervisory channel to inform the downstream node about the configuration adopted in the output split & select stage, to which the node downstream shall adjust its own input selectors.

More in detail, in case of failure on one operating fiber only, that is when the output fiber towards the next node in one direction is interrupted, the so-called link protection can be applied, which consists in switching all the channels of an operating fiber on its own protection fiber exiting the node to the same direction. The cross-connect connect in the next node, where the failure is detected, or where the protection configuration of the upstream node is communicated through the network supervision system, draws the channels from the input protection fiber, terminates those that must be terminated and routes those that must proceed in the ring into the output working fiber. Therefore, in this scheme a protection fiber is used only between two adjacent nodes, where necessary to counteract a single fiber break. Protection bridge units are not involved in this procedure, so they are disconnected and remain available to face possible equipment failures. A procedure similar to the link protection is used to protect failures on the input WDM stage or on the single input optical splitter $S_{IN}$, or on the single optical combiner, or on the output WDM stage of the node.

An innovative aspect of such a link protection procedure is given by the fact that it acts on single optical channels, therefore the protection of the WDM aggregate is simply obtained as sum of the protections of the single channels that form the WDM flow. This mode of operation enables a higher flexibility; for instance, the failure of an Output selector $X_{out,k,l}$ (FIG. 9b) can be protected on individual basis.

On the contrary, should alt the four fibers between two nodes break, then the two CCW downstream and the two CW upstream fibers (if the break is in the right part of the ring in FIG. 5a), or the two CW downstream and the two CCW upstream fibers (if the left part of the ring is broken) are no more usable in the node. Consequently, the link protection can not operate, since also the associated protection fiber results being interrupted. In this case, a different protection scheme can be applied, belonging to the so-called "ring protection" class; it involves all the ring nodes, in particular the two nodes between which the fiber interruption takes place. Said ring protection is described for simplicity making the distinction between two cases: the failure of the two output fibers (working and protection) from la same side of the node, and the failure of the two input fibers (working and protection) in the same side of the node; actually, the two situations can occur jointly, as aalready said. In the first case, the output optical selectors, interfaced to the protection fiber going out towards the side opposite to that where the failure occurred, select the channels originally destined to be transmitted towards the broken side. In the second case, the following actions are performed on the input optical selectors, connected to the bridge units which were receiving the channels from the broken working fiber: if supporting channels in transit, they are disconnected; if supporting terminated channels, their inputs are switched in order to receive the relevant channels from the non broken protection fiber, generally associated to the opposite running direction.

In all the intermediate nodes of the ring, the channels protected through ring protection are received by the protection fiber, that can be considered as an ideal extension of that used to the purpose by one or the other or both the nodes between which fibers are interrupted. For what said above, we can argue how the channels can profitably employ the other running direction of the ring to reach the node whose direct access is prevented by the failure. In the intermediate nodes crossed by the ring protection paths, the protection bridge units support the transit of protected channels, without interfering in any way with the working bridge units, that support the operation traffic not affected by the failure. In the case anode is the terminal for one or more protected channels, the working bridge units of the channels to be terminated receive the relevant channel from the ring protection fiber rather than from the working one; also in this case, the protection bridge units of the terminated channels have to be disconnected.

A procedure similar to the ring protection is used to protect a double failure, concerning an output optical amplifier, or an optical combiner C, or the connection between them, and simultaneously the relevant protection equipment. As already explained for the link protection, also the ring protection procedure is made channel by channel. This operation method enables a higher flexibility, for instance, the double failure of an output optical selector $X_{OUT}$ and of its protection duplicated component can be protected separately.

In case of failure of internal equipment, that includes the failure of an input optical selector $X_{in,k,l}$, or of a channel filter $F_{k,l}$ or of a bridge unit, or of an output splitter $X_{out,k,l}$, or of an interconnection among the above mentioned modules, an equipment protection procedure is applied, through which the stand-by bridge unit (and consequently the associated input selector, channel filter and output splitter) is selected for the access to the operating fiber of the ring, both at the input and at the output sides, and jointly the failed bridge unit is isolated (its input and output ports are disconnected) to avoid to cause troubles to the signal on the output operating fiber. The equipment protection, implemented in this way, satisfies the property to be confined inside the node where the failure occurred, without requiring network protection mechanisms.

It must be particularly noticed how the protection bridge units and the relevant input selectors, channel filter and output splitter, have the double role to support equipment protection procedures and network protection (more in detail, ring protection), according to the needs; this undoubtedly represents an advantage deriving from the full duplication of the bridge units inside the node.

In all the examined situations, the minimum necessary amount of redundancy resources is employed for the different protection procedures. Thanks to the above, the proposed node architecture, in given cases, can remedy a double failure, for instance, when a local equipment on the transmission side fails simultaneously to the operating fiber of the ring in the output direction. In this case the subject architecture enables to have access to the stand-by bridge unit, which, thanks to the high parallelism of the output structure of FIG. 9b, can have access to all the output fibers and therefore also to the protection fiber in the output direction, that is selected. Whenever the correct input fiber, the working or the protection one according to the upstream condition, is not already selected at the input of the stand-by bridge unit, it shall be necessary to select it. A similar assertion applies to the failure of local equipment in the receiving side, and when the break of a working fiber entering the ring occurs. Also in this case, the architecture enables to have access to the stand-by bridge unit, which, thanks to the high parallelism of the input structure of FIG. 9a, can have access to all the entering fibers to the node, and therefore also to the input protection fiber that shall be selected. Whenever the correct output fiber, the working or the protection one according to the dowrnstream condition, is not already selected at the output of the stand-by bridge unit, the same shall be selected.

The redundancy of the bridge units in the cross-connect enables as well the redundancy of the local equipment related to the client signal, which, due to the redundancy itself, will avail of the protection in case of failure of the bridge unit, or of the client equipment associated to the same, or of the interconnection between them.

The discussion, about the local equipment protection has highlighted the strategic role assumed by the bridge units, combined with the high parallelism of the stages of input and output optical interconnections of the cross-connect, scope of the present invention. It should be appreciated how local channels can avail, separately, of the same resources offered to transit channels, that is the protection bridge units and the consequent possibility of accessing both working and protection fibers. It is also remarkable that the protection offered to local channels does not necessarily involve the WDM aggregate which they are associated to. Considering what already highlighted in the foreword, similar possibilities were not fully guaranteed in the background art.

Figure 6:
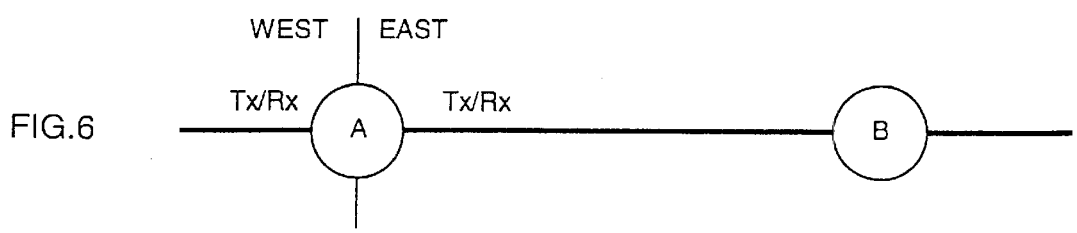
Figure 6A:
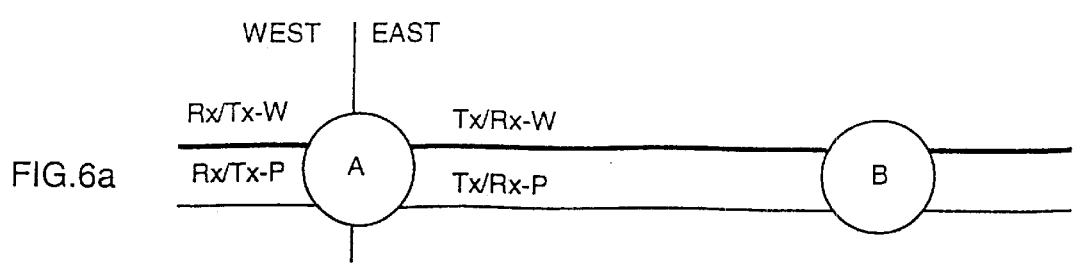

The architecture of the cross-connect shown in FIGS. 9a and 9b remains valid if the node is part of a two-fiber ring, in which each fiber is used in bidirectional way and supports channels in both the transmission directions, as it results from FIG. 6a. In this case, the wavelengths are partitioned in two groups, one to transmit and the other one to receive channels, with the constrain that the λ of a group are different from those of the other group. In the considered case, each bi-directional fiber shall be connected to a port of a three-way optical circulator, whose remaining ports are connected to two optical fibers involving one input port and one output port of the cross-connect, respectively. Therefore there will be four circulators, to be considered as external to the node and therefore not necessarily being part of the present invention.

The aforementioned protection methods, described in a ring network context, are not the only possible. In fact, the proposed architecture can be also applied in the nodes of a meshed network, like that of FIG. 4; in this case the node input and output fibers no longer play the role of ring fibers, as in FIG. 5a, but support four different bidirectional connections to four adjacent network nodes. Also in this new context, the proposed architecture, thanks to the full reconfigurability of the input and output stages combined with the use of the bridge units, enables to implement protection schemes for local and transit channels, by routing, for instance, a channel towards two different nodes.

By generalizing the above-mentioned concept, it can be shown how the broadcasting of a channel is feasible with the proposed architecture.

We shall now examine some possible embodiments of the bridge units, to give an idea of their potential functionalities. This does not prevent the possibility to conceive different units which offer different functionality inside the same optical structure of the node.

Figure 11A:
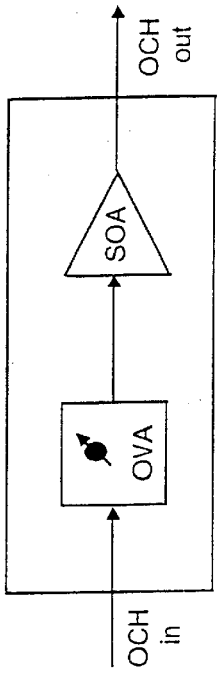
Figure 11B:
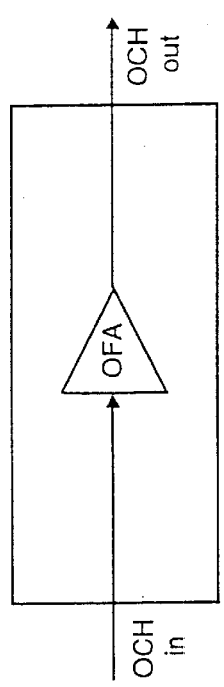
Figure 11C:
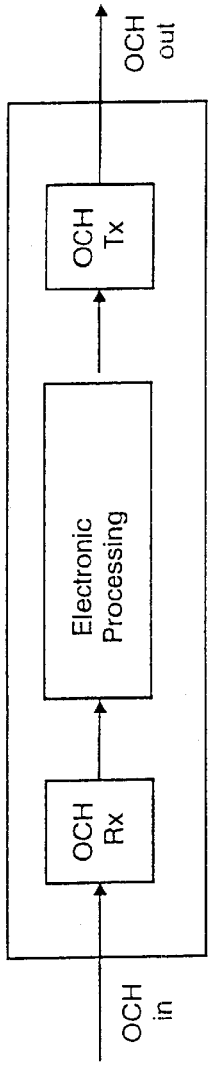
Figure 12:
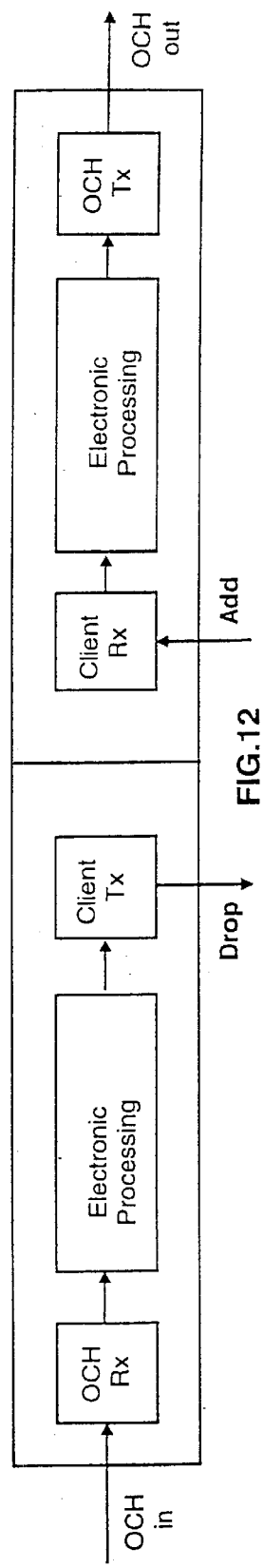

FIGS. 11, 12 and 13 show some possible options of bridge units, grouped according to the following criterion:

A) options to support the sole transit of channels, that are further classified according to the implementation methods, which may foresee or not the O/E/O (Optical/Electrical/Optical) conversion;

B) options to support the sole add/drop function on channels;

C) options to flexibly support both the functions mentioned under A) and B) above, that are further classified according to the implementation methods.

We shall describe below more in detail the different options. Notice that the definition 'optical channel' used hereinafter, is referred to a signal allocated to a definite wavelength, capable of being multiplexed in a WDM aggregate, and more in general meeting the requirements of the optical network; the 'client channel' definition is referred to a signal having variable characteristics, subject to the requirements of a generic telecommunication network that employs the optical network considered as physical support. Notice also that this does not exclude that the client channel too is physically an optical signal, on the contrary, this is the most common situation assumed below.

FIG. 11a shows a bridge unit for the sole transit, simply made of an optical amplifier OFA, having characteristics suitable to the amplification of a single channel, potentially low-cost, and capable to assure a constant output optical power, indirectly performing also the functions of power control and equalization.

FIG. 11b shows a bridge unit for the sole transit, in which the same functions as mentioned above are implemented by two different components, that is a variable optical attenuator (OVA), to level, the optical power, and a semiconductor optical amplifier (SOA).

FIG. 11c shows a bridge unit for the sole transit, in which the same functions as mentioned above are implemented through an O/E/O conversion; this is associated to additional important functions, that can be required in stringent way by the network specifications, such as regeneration, monitoring of the signal at electrical level, reading and possibly writing of the information carried by the overhead associated to the client channel.

More in particular:
  the OCH Rx block is an opto-electronic receiver for the optical channel related to the considered bridge unit, typically at high bit-rate (e.g. 10 Gbit/s)
  the 'Electronic Processing' block indicates all the electronic circuits performing 3R regeneration functions (performing the following functions: Receive, Reshape and Retime), monitoring on the electrical signal, possible reading and writing of the overhead of the client channel.
  the OCH Tx block indicatesan electro-optical transmitter of optical channel.

FIG. 12 shows a bridge unit for the sole drop and add functions of a channel; includes different parts, among which the 'OCH Rx', 'Electronic Processing', 'OCH Tx' blocks, already described, the 'Client Tx' block representing an opto-electronic transmitter for the client signal; the 'Client Rx' block representing an opto-electronic receiver for the client signal. Of course, the 'OCH' and 'Client' optical receivers and transmitters have the same functions, from the conceptual viewpoint, but differ as far as specifications and cost are concerned. The considered unit can also be described as the combination of two transponders, from optical channel to client and from client to optical channel. Both are implemented through an O/E/O conversion, according to the principle previously outlined in the description of FIG. 11.

Figure 13A:
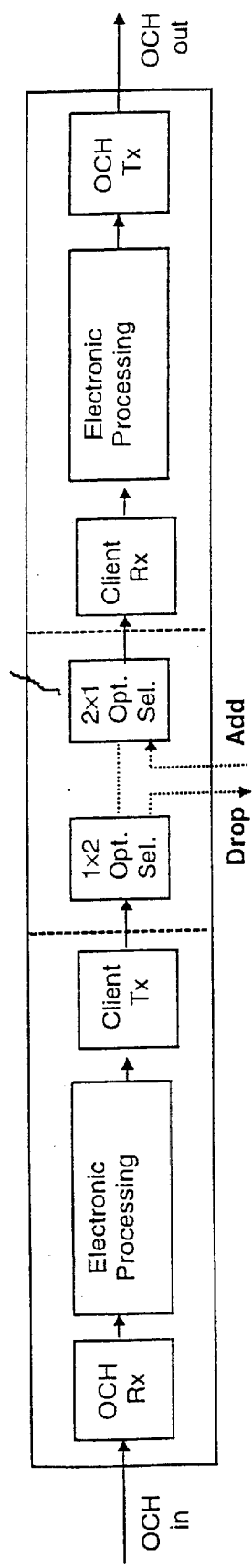
FIGS. 11 to 13 show some of the possible functional schemes of the blocks indicated as Bridge Units in FIGS. 8 and 9b.

FIG. 13a shows a bridge unit capable to support in a flexible way both the transit and the add/drop of the channel, through a double O/E/O conversion. It can be seen as the combination of two transponders, from optical channel to client and from client to optical channel, between which a simple optical switching stage is put, shown in the figure as composed of the two optical selectors "Opt. Sel." 1×2 and 2×1. It is also possible to use multi-way optical selectors, for instance 1×3, 3×1, to increase the cross-connect flexibility as far as the channel routing is concerned; this approach can be profitably adopted in nodes N1 and N2 of FIG. 3, placed in the interconnection points between two different rings. Notice that 3R Regeneration and signal electrical monitoring functions are included.

Figure 13B:
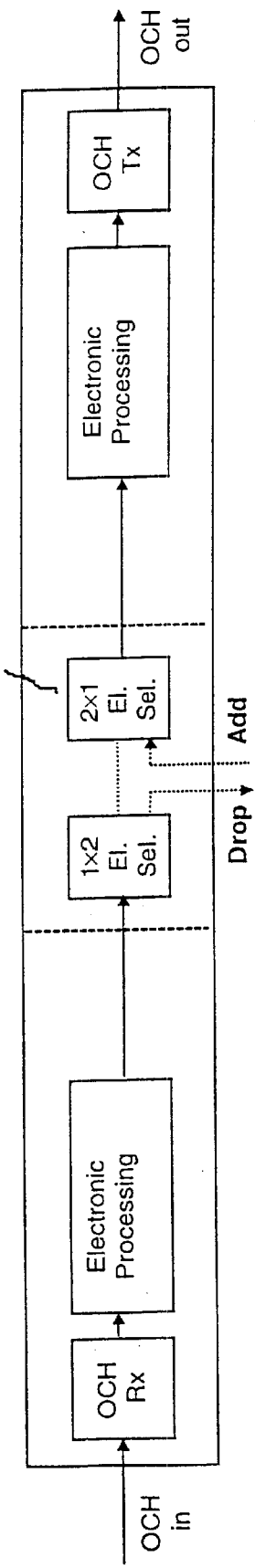

FIG. 13b shows a bridge unit capable to support in a flexible way both the transit and the add/drop of the channel, through a single O/E/O conversion. In this case, the choice between transit and add/drop function is made by an electronic space switching stage, shown in the figure as composed of the two electrical selectors "El.Sel." 1×2 and 2×1.

A general remark can be added: all the options of bridge unit including the O/E/O conversion and the regeneration of the transit channel perform also the wavelength conversion function, since they transfer the information from an input channel, which can be at any wavelength, to an output channel, transmitted by the unit itself, at a particular wavelength. This functionality, useful in any case, is absolutely necessary for the nodes assuring the interconnection of two rings (for instance nodes N1 and N2 in FIG. 3).

What is claimed is:

1. An optical channel cross-connect, connected to N input fibers and at least a same number of output fibers, being the fibers crossed by relevant signals obtained from the multiplexing of M component channels transmitted at different wavelengths and each input n-th fiber being connected to an n-th input optical splitter having N×M ways, said N×M ways being connected to n-th inputs of a set of N×M input optical selectorsl having N inputs and one output, the outputs of said optical selectors being connected to relevant optical channel filters tunable to any of the M wavelengths of the input signal, said filters being subdivided to form N groups of M filters, and each group of filters sending the M filtered channels towards an output stage including N optical combiners having M inputs and one output, the N outputs of the optical combiners being connected to a same number of optical output fibers, on which M channels are multiplexed, wherein the output stage additionally comprises:

N×M bridge units whose functionality is selectable on individual basis, each unit being connected downstream a relevant channel filter to receive a signal at any wavelength on which its own functionality is performed;

N×M output optical splitters having N output ways, each output splitter being connected downstream a relevant bridge unit to receive an optical channel at the wavelength, on which the above mentioned function has been performed, making it available on N ways;

N×M output optical selectors, having N inputs and one output, to receive N optical channels on N ways and select one to be sent to an input of a said optical combiner included in the output stage; the connections between said optical output splitters and selectors making available an m-th channel coming from said n-th group of channel filters, to an n-th input of N output optical selectors connected to relevant m-th inputs of said N optical combiners.

2. The optical channel cross-connect, according to claim 1, further comprising a control unit to diagnose internal failure conditions on devices involving single channels, and interruption conditions of at least one of the input or output fibers, in both transmission directions, wherein said control unit controls said input ($X_{IN}$) and output ($X_{OUT}$) selectors so as to subdivide said N fibers between working fibers, normally operating, and protection fibers, biuniquely associated to the working fibers, which substitute the same in case of failure and to distinguish the bridge units in working bridge units, normally associated to the channels of a working fiber, in absence of failures in said units and/or interruptions of said working fibers, and protection bridge units, which are a duplicate of relevant working bridge units and substituting the same in case of said failure and/or interruption.

3. Optical channel cross-connect according to claim 2, wherein in case of failure of a working bridge unit, or of client equipment connected to the same, or of the connection between them, or of said input selector or of said channel optical filter, associated to the same:

said output optical selector that normally selects the bridge unit that is no longer usable is forced to switch, to select the protection bridge unit in stand-by and associate the protection bridge unit to the output working fiber, thus disconnecting the no longer usable bridge unit;

said input optical selector connected to the bridge unit that is no longer usable, and said input optical selector connected to said corresponding protection bridge unit, are forced to perform a switching, to associate the protection bridge unit to the input working fiber and disconnect the non-usable bridge unit, enabling protection of functionality of the channel, in case of failure of the working bridge unit, and not of the working fibers, preventing the failed unit to interfere on the transmitted signal; and said tunable filter associated to said corresponding protection bridge unit is tuned on the same wavelength of the filter associated to the corresponding no longer usable working bridge unit, if this condition did not occur yet.

4. The optical channel cross-connect, according to claim 2, wherein in case of failure of an output working fiber, or of failure on an output optical amplifier placed between said output working fiber and a relevant said optical combiner, of a said relevant optical combiner or of a said output selector or of one of the connections among the above mentioned components:

said output optical selectors associated to the interrupted fiber or to the elements where the failure occurred, and said output optical selectors associated to the corresponding protection fiber or to the corresponding protection elements, are individually forced to switch, to select a relevant bridge unit and associate it to the output protection fiber, thus disconnecting the corresponding protection bridge unit, and disconnecting also the relevant working bridge unit from the working output fiber.

5. The optical channel cross-connect according to claim 2, wherein in case of break of an input working fiber, or of failure on an input optical amplifier placed between said input working fiber and a relevant input optical splitter, or of said input optical splitter, or of one of the connections among the above mentioned components:

said input optical selectors connected to said working bridge units, and said input optical selectors connected to said protection bridge units, are individually forced to switch to associate a relevant working bridge unit to the input protection fiber, and disconnects the corresponding protection bridge unit.

6. The optical channel cross-connect according to claim 2, wherein said optical channel cross-connect is included in a node of an optical fiber ring, composed of several nodes and that, in case of failure of one output working fiber, or of failure of an output optical amplifier, or of said optical combiner, or of said output optical selector and simultaneously of unavailability of the relevant protection resources, due to a further break of the corresponding output protection fiber, or to a further failure of one of the relevant output optical amplifiers, or optical combiner, or output optical selector, associated to said output protection fiber:

said output optical selectors associated to an interrupted fiber or to the elements where the failure occurred, and said output optical selectors associated to the output protection fiber on the opposite side with respect to the one where the failure occurred, are individually forced to switch, to select a relevant working bridge unit and associate it to said output protection fiber on the opposite side, thus disconnecting the corresponding protection bridge unit associated to the fiber itself, and disconnects a relevant working or protection bridge unit from the output working or protection fiber on which the failure occurred.

7. The optical channel cross-connect according to claim 2, wherein said optical channel cross-connect is included in a node of an optical fiber ring composed of several nodes and in case of failure of one input working fiber, or of failure of an input optical amplifier, or of a said input optical splitter and simultaneously of unavailability of the relevant protection resources, due to a further break of the corresponding input protection fiber, or to a further failure of one of the relevant input optical amplifiers, or input optical splitter associated to said input protection fiber:

said input optical selectors connected to said working bridge units, which in normal conditions support a connection terminated at the node, and said input optical selectors connected to protection bridge units associated to protection fiber entering the opposite side with respect to the one where the failure occurred, are individually forced to switch, to associate a relevant working bridge unit to said protection fiber entering the opposite side and disconnects the corresponding protection bridge unit associated to the fiber itself; and said input optical selectors connected to said working bridge units, which in normal conditions support a connection in transit through the node, and said input optical selectors connected to protection bridge units associated to the protection entering fiber where the failure occurred, are individually forced to switch, to disconnect a relevant working bridge unit from the working or protection fibers at the input side where failures occurred.

8. The optical channel cross-connect according to claim 2, wherein said optical channel cross-connect is included in a node of an optical fiber ring composed of several nodes and in case of joint failure, in a link of the ring not adjacent to the considered node, of a working fiber and of the relevant protection fiber, the configuration of said input and output optical selectors and of the tunable filters, associated to the protection bridge units and to the input and output protection fiber, are arranged to allow the transit of protected channels, through the protection bridge units, in the two transmission directions.

9. The optical channel cross-connect according to claim 2, wherein said optical channel cross-connect is included in a node of an optical fiber ring composed of several nodes and in case of joint failure, in a link of the ring not adjacent to the considered node, of a working fiber and of the relevant protection fiber:

one said input optical selector connected to a working bridge unit that in normal operating conditions locally terminates a channel entering the working fiber and one said input optical selector connected to a protection bridge unit associated to the protection fiber entering the opposite side in respect with that of said working fiber, said protection bridge unit protecting the same channel that must be terminated, are individually forced to switch to associate said working bridge unit to said protection fiber entering the opposite side and disconnects the corresponding protection unit associated to the same protection fiber.

10. Optical channel cross-connect according to claim 2, wherein in case of double failure due to the interruption of an input working fiber and to the failure of a working bridge unit, or of the client equipment connected to the working bridge unit, or of the connection between them, or of said input selector, or of said channel filter associated to the working bridge unit:

said output optical selector that normally selects the bridge unit that is no longer usable, and said output optical selector that normally selects the corresponding protection bridge unit, are forced to switch, to select the protection bridge unit and associate it to the protection output fiber, if this condition did not occur yet, and disconnects the no longer usable bridge unit;

said input optical selector connected to the bridge unit that is no longer usable, and said input optical selector connected to the corresponding protection bridge unit, are forced to switch, to associate the protection bridge unit to the correct input fiber, working or protection, according to the condition upstream, and disconnects the no longer usable bridge unit; and said tunable filter associated to said corresponding protection bridge unit is tuned on the same wavelength of the filter associated to the corresponding no longer usable working bridge unit, if this condition did not occurred yet.

11. The optical channel cross-connect, according to claim 2, wherein in case of double failure due to the interruption of an input working fiber and to the failure of a working bridge unit, or of the client equipment connected to the working bridge unit, or of the connection between them, or of said input selector, or of said channel filter associated to the working bridge unit:

said input optical selector connected to the bridge unit that is no longer usable, and said input optical selector connected to the corresponding protection bridge unit, are forced to switch in order to associate the input protection fiber to the protection bridge unit, if said condition did not occurred yet, and disconnects the no longer usable bridge unit;

said tunable filter associated to said corresponding protection bridge unit is tuned on the same wavelength of the filter associated to the corresponding no longer usable working bridge unit, if this condition did not occurred yet; and said output optical selector that normally selects the bridge unit that is no longer usable, and said output optical selector that normally selects the corresponding protection bridge unit, are forced to switch in order to select the protection bridge unit and associate it to the correct output fiber, working or protection, according to the condition downstream, and disconnects the no longer usable bridge unit.

12. The optical channel cross-connect according to claim 1, wherein at least one bridge unit includes:

a first transponder from optical channel to client equipment;

a second transponder from client equipment to optical channel; and a pair of optical selectors in cascade placed between the transponders, the selectors being individually controlled to connect the client equipment to the optical channel, and vice versa, or to disconnect the client equipment and enable the transit of the optical channel through the bridge unit.

13. The optical channel cross connect according to claim 12, wherein said optical switches have more than two ways, thus improving the flexibility of the cross-connect in optical channel routing.

14. The optical channel cross connect according to claim 1, bridge unit includes:
- a receiving stage;
- a transmitting stage; and
- a pair of electronic selectors in cascade, placed between the receiving and transmitting stages, the selectors being individually controlled to connect a a client equipment to the optical channel, and vice versa, or to disconnect client equipment and enable the transit of the optical channel through the bridge unit.

15. The optical channel cross connect according to claim 1, wherein said bridge unit includes an optical amplifier optimized to operate on single channel.

16. The optical channel cross connect according claim 1, wherein at least one bridge unit includes a transponder from optical channel to optical channel, capable to perform also 3R Regeaneration and wavelength conversion functions.

17. The optical channel cross connect according to claim 1, wherein at least one said bridge unit includes:
- a first transponder from optical channel to client equipment, performing the a channel drop function; and
- a second transponder from client equipment to optical channel, performing a channel add function.

18. The optical channel cross connect according to claim 1, bridge unit includes an optical amplifier (OFA or SOA) optimized to operate on a single channel and an optical variable attenuator (OVA) placed upstream said amplifier.

* * * * *